(No Model.)
W. DODD & A. T. MARTIN.
DRIVE CHAIN.
No. 478,416. Patented July 5, 1892.
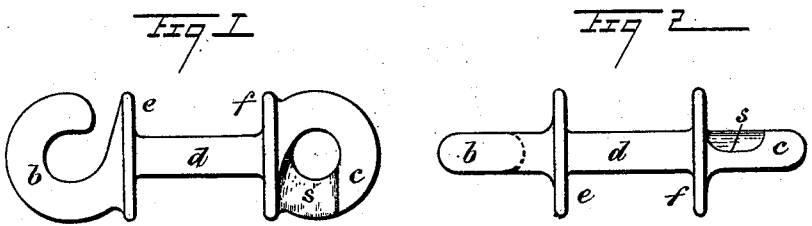
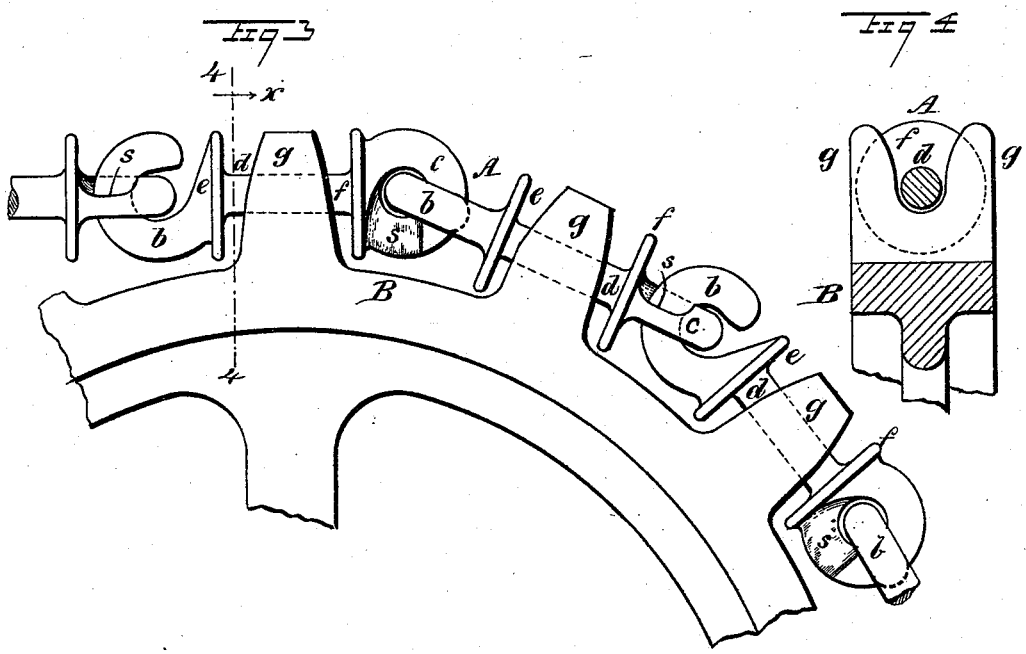
WITNESSES:
H. Walker
C. Sedgwick
INVENTORS:
A. T. Martin
W. Dodd
BY Munn & Co
ATTORNEYS.

UNITED STATES PATENT OFFICE.

WEST DODD, OF SAC CITY, AND ARTHUR T. MARTIN, OF CLINTON, IOWA.

DRIVE-CHAIN.

SPECIFICATION forming part of Letters Patent No. 478,416, dated July 5, 1892.

Application filed August 7, 1891. Serial No. 401,989. (No model.)

*To all whom it may concern:*

Be it known that we, WEST DODD, of Sac City, and ARTHUR T. MARTIN, of Clinton township, in the county of Sac and State of Iowa, have invented a new and and useful Improvement in Drive-Chains, of which the following is a full, clear, and exact description.

Our improvement consists in the construction of a drive-chain link, as hereinafter described.

Reference is to be had to the accompanying drawings, forming a part of this specification, in which similar letters of reference indicate corresponding parts in all the figures.

Figures 1 and 2 represent longitudinal views, in planes at right angles with each other, of one of the links of the chain. Fig. 3 is a side view of a sprocket-wheel in part having sprockets or teeth of special construction adapted to engage with said chain and showing a portion of the chain as engaging therewith. Fig. 4 is a sectional view upon the line 4 4 in Fig. 3, looking in direction of the arrow *x*.

A is the chain, composed of any number of similar links, which may be forged or cast, as desired, and are each formed with a hook *b* at their one end and an eye *c* at their opposite end in line with the hook *b* and connected with the hook by a round shaft or shank *d*, having flanges *e f* next to the inner ends of the hook and eye, respectively, the whole being made or cast in one piece. The hook *b* of each successive link is in free engagement with the eye *c* of the next link, which makes the hook and eye of any one link to be out of plane with or substantially at right angles to the hook and eye of the next link. The flanges *e* and *f* on the links are to secure the meshing or engagement of the links with the sprockets or teeth of the wheels the chain is applied to for transmitting the required motion from one wheel-shaft to another. To this end sprocket-wheels are used similar to that B shown in part in Figs. 3 and 4, in which each sprocket or tooth is made bifurcated or with two opposite side horns *g g*, adapted to freely receive the shank *d* of each link in between them without permitting of the flanges *e f* through them, but only of passing outside or over them in common with the shank of the links as the chain comes onto and leaves the wheel. The nose of the hook *b* in each link comes in too-close proximity to the butt of the hook or flange *e* to permit of the hook entering the eye of the adjacent link at that point; but each link-eye *c* is made with a recess or reduction *s* in it to one side of its end of sufficient size, by suitably manipulating the engaging links, to enter the hook of one link in the eye of the next link. This makes it more difficult for the links to become detached from each other when the chain is in use. If the eye were constructed so that the hook of the engaging-link would enter the eye at any time, then should the chain be slackened or jerked a little the links would readily become unfastened while the chain was in use and fall apart.

A chain constructed as described is perfectly flexible as regards its links one upon the other in any direction and yet will have a secure driving connection with the wheel or wheels. Accordingly the links will be free to engage with and pass around its engaging-wheel to any desired point in any direction. The chain can also be crossed to reverse the motion of the shafts it is used to transmit power to or from and can readily be carried to any desired place to connect wheels or pulleys at any desired angle relatively to each other by simply using suitably-arranged loose intervening guide-wheels, pulleys, or idlers. To do this, it is necessary, first, that the chain should be universally flexible—that is, its links should be flexible in any direction relatively to each other—and, secondly, when turned in any direction its links should be capable of slipping into the sprockets they are designed to engage with. This is secured by the construction of the hook and eye, as hereinbefore described, of each link and round form of the shaft connecting said hook and eye, while the driving connection of the links with either sprocket-wheel is secured by the flanges at or near opposite end of the shank of the links. Although in the links, as represented and described, each link has its hook and eye in the same plane, this is not absolutely necessary, as they might be in any or different planes.

Having thus described our invention, what we claim as new, and desire to secure by Letters Patent, is—

As an article of manufacture, the improved drive-chain link constructed integrally with a hook at one end and an eye at the other and radial flanges located at the respective ends of its shank and contiguous to said hook and eye, as shown and described.

WEST DODD.
ARTHUR T. MARTIN.

Witnesses:
GEO A. MARTIN,
GEO. SEHALLEY.